United States Patent
Phadke

(10) Patent No.: US 10,511,230 B2
(45) Date of Patent: Dec. 17, 2019

(54) ADAPTIVE WAKEUP TIME CONTROL IN BURST MODE OF A PRIMARY SIDE REGULATED FLYBACK CONVERTER

(71) Applicant: Apple Inc., Cupertino, CA (US)

(72) Inventor: Vijay Phadke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/950,270

(22) Filed: Apr. 11, 2018

(65) Prior Publication Data
US 2019/0229626 A1    Jul. 25, 2019

Related U.S. Application Data

(60) Provisional application No. 62/620,779, filed on Jan. 23, 2018.

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 3/335* (2013.01); *H02M 2001/0035* (2013.01)

(58) Field of Classification Search
CPC ............ H02M 3/07; H02M 3/10; H02M 3/19; H02M 3/25; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569

USPC ......... 323/21.12, 21.13, 21.15, 21.16, 21.17, 323/21.18
See application file for complete search history.

(56) References Cited

U.S. PATENT DOCUMENTS

| | | | |
|---|---|---|---|
| 10,243,469 B1 * | 3/2019 | Liu ................... | H02M 3/33507 |
| 2003/0117813 A1 * | 6/2003 | Hong ................ | H02M 3/33507 363/16 |
| 2014/0369086 A1 * | 12/2014 | Hayasaki ............... | G03G 15/80 363/21.14 |
| 2016/0254753 A1 * | 9/2016 | Malinin ............ | H02M 3/33507 363/21.16 |
| 2017/0077826 A1 * | 3/2017 | Werner ............. | H02M 3/33523 |
| 2018/0198368 A1 * | 7/2018 | Shaik .................... | H02M 3/158 |

* cited by examiner

*Primary Examiner* — Nguyen Tran
*Assistant Examiner* — Bryan R Perez
(74) *Attorney, Agent, or Firm* — Blank Rome LLP

(57) ABSTRACT

A flyback converter can include an auxiliary winding magnetically coupled to the secondary (output) for sensing a reflected output voltage. A controller can operate a power switch of the flyback converter in a burst mode to deliver a number of pulses, causing the output voltage to reach a threshold, and thereafter suspend switching for a predetermined time period before delivering a further number of pulses. The delivered number of pulses can be counted, and, responsive to a determination that the count is less than a predetermined minimum number of pulses, the predetermined time period can be increased. Responsive to a determination that the count is greater than a predetermined maximum number of pulses, the predetermined time period can be decreased.

14 Claims, 5 Drawing Sheets

ADAPTIVE WAKEUP TIME CONTROL IN BURST MODE OF A PRIMARY SIDE REGULATED FLYBACK CONVERTER

BACKGROUND

The discontinuous mode flyback converter is a commonly used topology for low power AC/DC adapters used with consumer electronic devices. Such consumer electronics devices tend to be cost sensitive, yet also be able to meet increasingly stringent energy efficiency requirements. It is not uncommon for such AC/DC adapters to remain plugged in to a power outlet, even when the electronic device is not connected to it. Meeting energy efficiency requirements in this mode of operation necessitates a very low power consumption mode of operation, sometimes known as a "standby mode." Other operating modes can include fixed frequency mode, valley switching mode, or boundary/variable frequency mode.

In any of these operating modes, the converter will experience both variable and fixed power losses. Variable power losses increase or decrease with output power, and include conduction losses related to various circuit resistances as well as transformer core losses. Fixed power losses remain substantially constant regardless of output power delivered to the load. Such fixed power losses include gate drive power losses, various capacitive switching losses, and other phantom loads such as internal bias power, preloads, etc. Although these fixed power losses are negligible at maximum power, they become a significant percentage of losses under low load conditions. In boundary/variable frequency mode, frequency increases with decreasing load, which can cause some of the "fixed" losses, such as switching losses, to increase with decreasing output power. To minimize the impact of these, burst mode operation (as described in greater detail below) may be used under light load conditions such as the standby mode.

Other design considerations and/or operating constraints may also require modifications to conventional flyback converter designs. For example, isolation requirements between the input and output of the flyback converter may, in some embodiments, be addressed by providing primary side regulation. With primary side regulation, all of the sensing and control necessary for control of the flyback converter is performed on the input side (as described in greater detail below). When using primary side regulation, ensuring that the output voltage remains sufficiently regulated can become difficult, particularly in low load and/or burst mode operating conditions. Thus, what is needed in the art and disclosed herein are improvements to primary side regulated flyback converters operating in the burst mode.

SUMMARY

In some embodiments, a power converter can be a flyback converter having a primary side with a primary winding operatively coupled to an input power source by a power switch and a secondary side having a secondary winding magnetically coupled to the primary winding and electrically coupled to an output configured for connection to a load. The flyback converter can further include an auxiliary winding magnetically coupled to the secondary winding and operatively coupled to a controller. The controller can be configured to operate the power switch responsive to a reflected output voltage sensed via the auxiliary winding to alternately close and open the power switch. Closing the power switch can store energy from the input power source in the primary winding, and opening the power switch can deliver energy from the secondary winding to the output.

The controller can be further configured to operate in a voltage regulation mode when a voltage error signal of the power converter exceeds a first threshold and transition to an energy regulation mode when the voltage error signal of the power converter falls below the first threshold. The controller can be still further configured to transition back to a voltage regulation mode when a voltage error signal of the power converter exceeds a second threshold. The second threshold can be greater than the first threshold. The energy regulation mode can include a burst mode of operation in which the controller is configured to operate the power switch to deliver a number of pulses, thereby causing the reflected output voltage to reach an output voltage high threshold, and thereafter suspend switching for a predetermined time period before delivering a further number of pulses.

The controller can be further configured to count the number of pulses delivered and, responsive to a determination that the count is less than a predetermined minimum number of pulses, increase the predetermined time period or, responsive to a determination that the count is greater than a predetermined maximum number of pulses, decrease the predetermined time period. The controller can be configured to increase the predetermined time period by doubling the predetermined time period and decrease the predetermined time period by halving the predetermined time period. The minimum number of pulses can be at least two. In some embodiments the minimum number of pulses can be five and the maximum number of pulses can be twelve.

In other embodiments, the power converter can include a USB-C controller configured to detect connection of an external device as a load to the output of the power converter and, responsive thereto, adjust a preload on the output of the power converter.

Other embodiments relate to a controller for a flyback converter. The controller can include an input configured to receive a reflected output voltage of the flyback converter via an auxiliary winding of the flyback converter. The auxiliary winding can be magnetically coupled to a secondary winding of the flyback converter, with the secondary winding being electrically coupled to an output of the flyback converter. The controller can further include an output configured to be coupled to a power switch of the flyback converter. The power switch may be operable to alternately couple and decouple a primary winding of the flyback converter to an input power source, thereby delivering pulses of energy from an input of the flyback converter to an output of the flyback converter. The controller can further include circuitry configured to operate the power switch to deliver a number of pulses, thereby causing the reflected output voltage to reach an output voltage high threshold and thereafter suspend switching for a predetermined time period before delivering a further number of pulses.

The circuitry of the controller may be further configured to count the number of pulses and, responsive to a determination that the count is less than a predetermined minimum number of pulses, increase the predetermined time period or, responsive to a determination that the count is greater than a predetermined maximum number of pulses, decrease the predetermined time period. The circuitry can increase the predetermined time period by doubling the predetermined time period and decrease the predetermined time period by halving the predetermined time period. The minimum number of pulses may be at least two. The minimum number of pulses can five, and the maximum number of pulses can be twelve.

The controller may be implemented as a microprocessor, microcontroller, or other circuitry.

Another embodiment includes a method of operating a flyback converter. The flyback converter can include a primary side including a primary winding operatively coupled to an input power source by a power switch, a secondary side including a secondary winding magnetically coupled to the primary winding and electrically coupled to an output, and an auxiliary winding magnetically coupled to the secondary winding. The method can include sensing a reflected output voltage of the flyback converter via the auxiliary winding, responsive to the reflected output voltage, operating the power switch to deliver a number of pulses, thereby causing the reflected output voltage to reach an output voltage high threshold, and suspending switching for a predetermined time period before delivering a further number of pulses.

Operating the power switch to deliver a number of pulses can include counting the number of pulses and, responsive to a determination that the count is less than a predetermined minimum number of pulses, increasing the predetermined time period or, responsive to a determination that the count is greater than a predetermined maximum number of pulses, decreasing the predetermined time period. Increasing the predetermined time period can include doubling the predetermined time period, and decreasing the predetermined time period can include halving the predetermined time period. The minimum number of pulses can be at least two. The minimum number of pulses can be five and the maximum number of pulses can be twelve.

DETAILED DESCRIPTION

Figure 1:
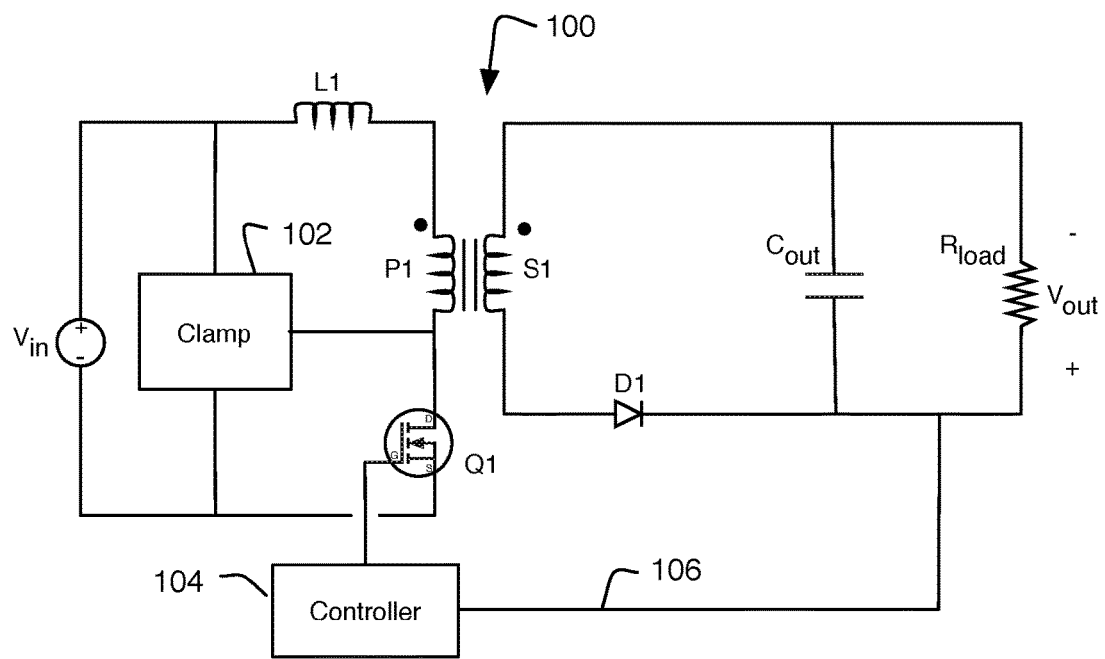
FIG. 1 depicts a flyback converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Flyback Converter Topology

FIG. 1 shows a typical active clamp flyback converter 100. As shown in FIG. 1, the flyback converter 100 may include an input power source Vin, which may be positioned in series with a primary winding P1, and a power switch Q1 coupled between the primary winding P1 and the power source V1. The flyback converter may further comprise active clamp circuitry 102, which may take a variety of forms not pertinent to the present disclosure. Exemplary active clamp circuits are depicted in Applicant's issued U.S. Pat. No. 9,774,270 and Applicant's co-pending U.S. patent application Ser. No. 15/405,901, which are hereby incorporated by reference in their entirety. These and other active clamp designs may be used in conjunction with the teachings of the present disclosure.

Flyback converter 100 further includes a secondary winding S1, which may be magnetically coupled to primary winding P1 and may provide an output voltage Vout to power one or more loads (represented by resistor Rload). Flyback converter may further also includes a rectifying diode D1 in series with the secondary winding S1 and an output capacitor Cout in parallel with the output voltage Vout. In some embodiments rectifying diode D1 may be implemented as a synchronous rectifier. The flyback converter 100 shown in FIG. 1 also includes controller 104, which operates primary switch as described below and may also include integrated gate drive circuitry for power switch Q1. Alternatively, gate drive circuitry for main switch Q1 may be implemented separately. Controller 104 may receive an indication of output voltage Vout via line 106, which may include an optocoupler or other mechanism for isolating the input and output sides, as well as other conditioning circuitry. Controller 104 may be implemented using a variety of different circuitry, including a suitably programmed microprocessor or microcontroller, a dedicated converter controller (such as those available from various vendors), a field programmable gate array (FPGA), application specific integrated circuit (ASIC), dedicated discrete circuitry, etc.

Typically, imperfect coupling between the primary winding P1 and the secondary winding S1 may result in a parasitic leakage inductance, which may store energy while the power switch Q1 of the flyback converter is closed. This parasitic leakage inductance of primary winding P1 and secondary winding S1 is represented graphically in FIG. 1 as an inductor L1. In some instances, active clamp circuitry 102 may be configured with respect to the value of leakage inductance L1, such that the operating frequency and switching times may achieve zero voltage switching, or soft switching, at turn on of power switch Q1. Under certain operating conditions, the active clamp circuitry may also be used to recover energy stored in the leakage inductance.

Burst Mode Operation

Figure 2:
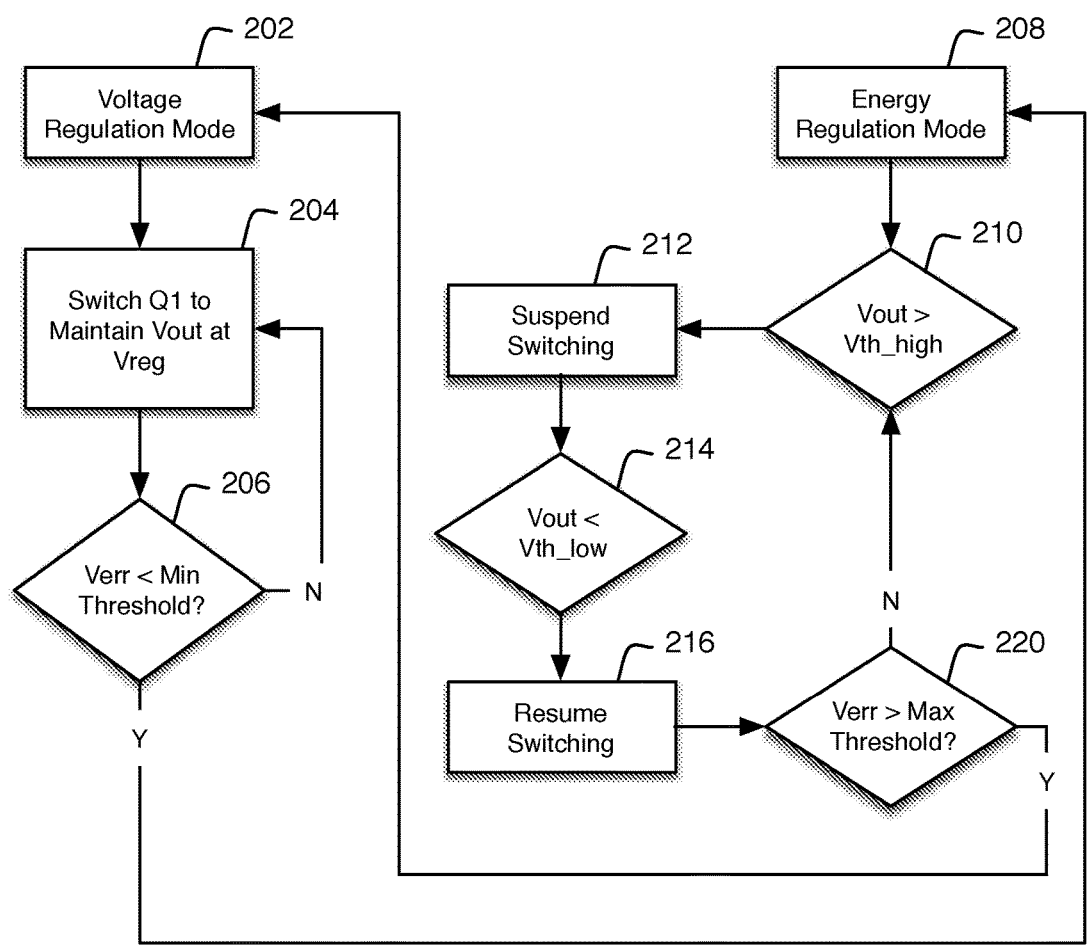
FIG. 2 depicts a flow chart of operating modes of a flyback converter having a voltage regulation mode and an energy regulation mode.

FIG. 2 depicts a flow chart illustrating operation of controller 104. At relatively higher output power levels, a flyback converter (such as flyback converter 100) may be operated in a voltage regulation mode 202. In this voltage regulation mode, peak current in the primary winding P1 is controlled to maintain output voltage Vout at its regulation set point (e.g., Vreg). Peak current through primary winding P1 may be controlled by varying the frequency and/or duty cycle of power switch Q1 according to various known techniques 204. When secondary side regulation is used, output voltage Vout is sensed directly, compared with a reference, and the resulting error signal may then be transferred to a primary side controller through an optocoupler (e.g., via line 106, FIG. 1). As the load on flyback converter 100 decreases, peak current in primary winding P1 decreases as well. In most practical flyback converter implementations, there is a lower threshold of the error signal (i.e., the difference between output voltage Vout and the voltage regulation setpoint Vreg). There is minimum value of peak primary winding current that corresponds to this minimum threshold. Once this lower threshold of the error signal/minimum value of peak primary winding current is reached (206), the error level is clamped, and the peak inductor current cannot decrease further. At this point the flyback converter may transition its mode of operation from voltage regulation mode 202 to energy regulation mode 208.

In the energy regulation mode of operation 208, flyback converter 100 maintains the minimum peak current through primary winding P1 to deliver a fixed amount of energy to the output. This fixed amount of energy is determined by the minimum size of the inductor current pulse (which is fixed for a given converter as a function of the various component impedances) and the pulse width and/or duty cycle, which may be controlled within certain bounds for a given converter and controller combination. If this fixed amount of energy is higher than the load demand, the balance of the energy will be stored in output capacitor Cout. This results in an increase in output voltage that causes the output voltage to rise above voltage regulation level. Because the minimum error is clamped, the control loop cannot reduce the primary winding current further to achieve voltage regulation. As a result, the converter may operate in hysteretic mode.

In the hysteretic mode, output voltage Vout may be allowed to reach an upper voltage threshold Vth_high above the voltage regulation level Vreg (210). Upon reaching this upper voltage threshold, switching of power switch Q1 and delivery of energy to the output may be temporarily stopped (212). While output switching is temporarily stopped, the output load Rload may continue to draw energy stored in output capacitor Cout, resulting in a decrease in output voltage Vout. Output voltage Vout may be allowed to decrease until it reaches a lower voltage threshold below the regulation level Vth_low. Once output voltage Vout reaches this lower threshold (214), switching of main power switch may be resumed (216). Flyback converter 100 may thus operate in a burst mode, in which the operation of power switch Q1 delivers packets of energy such that output voltage Vout swings back and forth between Vth_high (above voltage regulation setpoint Vreg) and Vth_low (below voltage regulation setpoint Vreg). The upper and lower voltage thresholds may be set such that the resultant ripple voltage is acceptable in a given application.

If the load increases to a point that the error signal remains above the minimum threshold (i.e., the peak current through primary winding P1 can remain above its minimum level) the controller can transition back to the voltage regulation mode (220). Suitable hysteresis may be provided so that the converter can exit the burst mode and resume continuous switching when power demands increases to a "maximum" threshold above the power demand corresponding to the minimum error/minimum peak primary winding current discussed above. For example, a flyback converter may enter burst mode operation at 10% load and exit burst mode at 15% load. This hysteresis in the transition between voltage regulation node and energy regulation mode can prevent erratic behavior when the load is very near the mode transition boundary.

Primary Side Regulation

For safety purposes, electrical isolation may be provided between the primary and secondary sides of flyback converter 100. As discussed above, when secondary side sensing is used, the required isolation may be provided by an optocoupler. However, including this optocoupler can increase both the cost and size of the resulting circuit. Thus, in some embodiments, primary side regulation (PSR) may be used to reduce costs and allow for smaller sized AC/DC adapters. Primary side regulation can eliminate the need for a voltage reference, error amplifier, and optocoupler on the secondary side, which can result in significant reductions in cost and packaging space.

Figure 3:
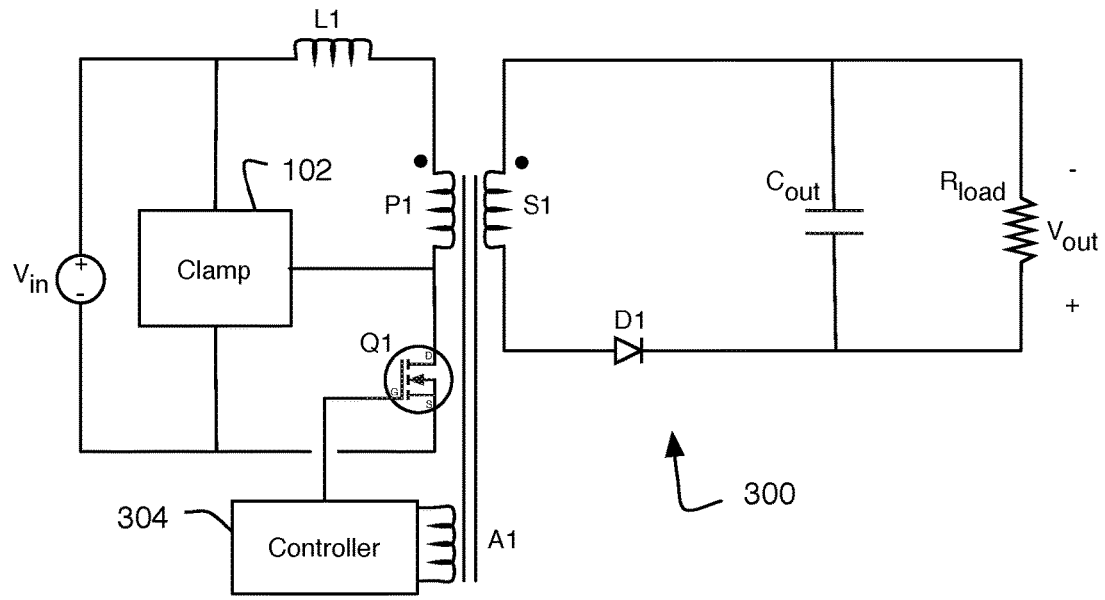
FIG. 3 depicts a flyback converter with primary side regulation.

Because the coupled primary (P1) and secondary (S1) windings are effectively a transformer/coupled inductor, an auxiliary winding (A1) may used on the primary side to indirectly monitor the output voltage (as shown in FIG. 3). When the power switch Q1 is on, current builds in primary winding P1, storing energy in the coupled inductors (i.e., transformer). When the power switch Q1 turns off, the voltage on all three windings reverses (i.e., so-called flyback), and current starts to flow from the secondary winding S1 to discharge the stored energy. Because auxiliary winding A1 has the same polarity as the secondary winding, a proportional reflection of output voltage Vout is impressed upon auxiliary winding A1. (However, it will be appreciated that this output voltage reflection appearing across auxiliary winding A1 is not precisely the output voltage, because it does not account for the voltage drop across secondary winding S1 and output rectifier D1.)

To counteract this effect, a sample and hold circuit may be used to capture the reflected voltage appearing across auxiliary winding A1 at the time just before the flyback transformer demagnetizes. At this instant, the secondary current is very low, and thus the voltage drops across secondary winding S1 and output rectifier D1 are small, thereby causing minimal error in the reflected output voltage. The details of sample and hold circuits, as well as the knee detection techniques used to identify the time just before flyback transformer magnetization, are known to those ordinarily skilled in the art, and thus will not be repeated here. In any case, using the reflected voltage appearing across auxiliary winding A1, controller 304 may have all components and inputs located on the primary side of flyback converter.

One issue that arises with this configuration is that there is a one cycle delay (i.e., one switching cycle of power switch Q1) in measuring output voltage Vout. This delay arises because output voltage Vout may only be monitored only during the flyback portion of the switching cycle, when the energy stored in the inductors (i.e., primary winding P1 and secondary winding S1) is delivered to the load. Furthermore, primary side monitoring of output voltage Vout is not possible when the converter is not switching. This creates challenges in burst mode operation because of how switching is periodically suspended (as described above).

More specifically, at lower loads, when the burst mode threshold is reached, switching is terminated. In the absence of flyback, controller 304 has no way to know output voltage Vout. While it is conceivably possible to estimate output voltage Vout using the magnitude of the load and the (known) size of the output capacitor Cout, in practice, the load may vary from nearly zero load to a load corresponding to the entry point into burst mode (e.g., 10% load, as discussed above). In some embodiments, this issue may be addressed by exiting burst mode (and returning to voltage regulation mode) after a predetermined time period, known as "wakeup time" (T_wake). After this wakeup time, the converter may "wake up" and provide a switching pulse, enabling controller 304 to see the reflection of output voltage at auxiliary winding A1. As necessary, switching may be continued until output voltage Vout reaches the Vth_high threshold. In practice, this may result in output voltage Vout never reaching or decreasing below the lower voltage threshold Vth_low. Thus, Vth_low cannot be accurately controlled, which makes the lowest level of output voltage Vout unpredictable.

If T_wake is too long, the voltage dip at the output can be substantial in cases where the load level is close to the burst mode entry point, causing low frequency output ripple. Such low frequency voltage ripple may causes ceramic capacitors to create undesirable acoustic noise due to piezoelectric effect. This effect can be counteracted through the use of a large (i.e., high capacitance) output capacitor, which can have the undesirable side effects of increased cost and space consumption. Alternatively, if T_wake is set low, then the burst frequency will be too high. This can undesirably increase the fixed power losses that the burst mode of operation is intended to counteract, reducing low load efficiency and increasing the standby mode power consumption.

Another potential issue with a T_wake that is too short is the possibility of creating an overvoltage condition at the output. In the burst mode, energy balance should maintained such that the converter does not deliver more energy than demanded by secondary side. Otherwise, the increasing energy stored in output capacitor Cout can cause output voltage Vout to increase to a level that is unacceptable to the output load. In some practical implementations, under a no load condition with a high input voltage, it is possible that the energy delivered by even a single switching pulse can exceed load demand. This situation can degrade light load voltage regulation and can even cause a stair case situation for the output voltage (in which Vout increases by a fixed amount with each pulse and never decreases), resulting in an overvoltage condition. This situation may be addressed by introducing a pre-load on the secondary side (such as a resistor in parallel with output capacitor Cout). However, this solution can also cause an increase in standby power consumption, which, to some extent, reduces the intended effect of the burst mode.

When an improved converter topology, such as the active clamp flyback topologies referenced above, is used, elimination of capacitive switching losses can allow much higher frequencies of flyback converter operation. Such high frequency operation can help reduce physical sizes of primary winding P1 and secondary winding S1, as well as output capacitor Cout. However, when operating in burst mode, the low frequency ripple at the output is a function of T_wake rather than switching frequency. Thus, the value (and corresponding physical size) of output capacitor Cout may be dictated by T_wake, negating some of the benefit of high frequency operation.

For example, if a 5V output converter rated for 10 W power delivers 1 W in burst mode with 200 microsecond inactive period (i.e., T_wake=200 us), then an output capacitance value of 404 uF is required to achieve <100 mV peak to peak output ripple. This limitation is independent of the switching frequency of the converter. For low frequency converter operation (e.g., 75 kHz), the hypothetical converter would require an output capacitance Cout somewhat larger than 404 uF to meet full load requirements, meaning that there is no penalty associated with the 200 microsecond inactive period. However, if the converter were to switch at 300 kHz, a smaller output capacitor could be used but for the capacitance required to meet the <100 mVpp output ripple specification in burst mode operation. Thus, in this case, there is a significant cost and physical space penalty for the 200 microsecond inactive period.

Adaptive Wakeup Time Control

The various challenges discussed above arise from cases in which the wakeup time T_wake is either too long or too short. Thus, all of the above issues may be addressed adaptively controlling T_wake from the burst mode entry point (relatively higher load) all the way to standby mode (nearly zero load) such that output voltage low frequency ripple is kept low without using oversized filter capacitors while achieving very low standby power. The adaptation of wakeup time T_wake may be understood with reference to FIGS. 4A-4C, which depict the switching operations of power switch Q1 during the burst mode of operation.

Figure 4A:
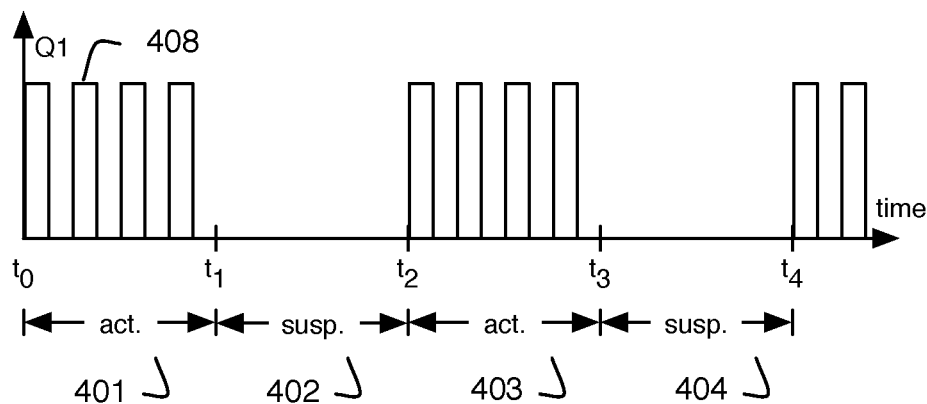
FIGS. 4A-4C depicts a series of switching events of a flyback converter operating in the burst mode with an adaptive wakeup time.

With reference to FIG. 4A, the burst mode of operation is illustrated as a series of active switching periods (401, 403) during which main switch Q1 is alternately opened and closed, as indicated by pulses 408 (corresponding to block 216 in FIG. 2) and a series of suspended switching periods (402, 404) during which main switch Q1 is not operated (corresponding to block 212 in FIG. 2). As described above, during the active switching periods 401, 403, energy will be drawn from input voltage Vin, temporarily stored in primary winding P1 while switch Q1 is closed, and delivered via secondary winding S1 to load Rload and output capacitor Cout during when switch Q1 is open. Whatever energy is not required by the load will be stored in output capacitor Cout, increasing its voltage up to the threshold Vth_high. Upon reaching Vth_high, switching is suspended, beginning a suspended state 402, 404. During the suspended states 402, 404, load Rload will draw energy from output capacitor Cout, decreasing its voltage. In FIG. 4A, the wakeup time T_wake is the length of the switching suspended periods, i.e., t4-t3 or t2-t1.

Figure 4B:
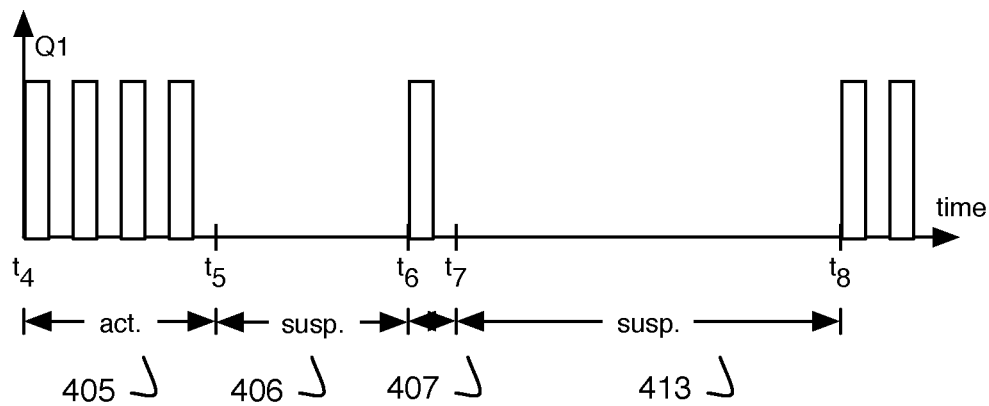

To adapt the wakeup time T_wake, controller 304 may keep count of the number of pulses during the active portion of the burst mode and maintain the number of pulses within predefined limits. When in the burst mode, controller 304 can cause the converter to deliver more than a minimum number "n" of switching pulses during a given active period. If the number of switching pulses fall less than n, then T_wake may be increased (i.e., additively or multiplicatively increased by any suitable amount). This scenario is illustrated in FIG. 4B. For purposes of this example, let n be two pulses (although other values could be used), and let the increase of T_wake be a doubling. During active period 405, four pulses are delivered to bring the output voltage Vout back to Vth_high. Thus, T_wake, which is how long suspended period 406 lasts, i.e., how long after time t5 (marking the end of active period 405 and the beginning of suspended period 406) a new active period 407 will begin, remains constant.

However, during active period 407, only one pulse is delivered to bring the output voltage Vout back to Vth_high. Thus, T_wake may be doubled, meaning that suspended period 413 is twice as long as suspended period 406. Put another way, t8–t7 is twice t6–t5. (As noted above, T_wake need not be doubled, but rather may be additively or multiplicatively increased by any suitable amount. An additive increase can include adding a predetermined amount of time to T_wake, while a multiplicative increase can include multiplying T_wake by a predetermined value.) At time t8, another active period begins, and a number of pulses n is delivered to again bring the output voltage Vout back to Vth_high. If the number of pulses required is not less than n (e.g., two), then T_wake will not decrease further. Alternatively, if only one pulse is required, then T_wake will be reduced again.

Figure 4C:
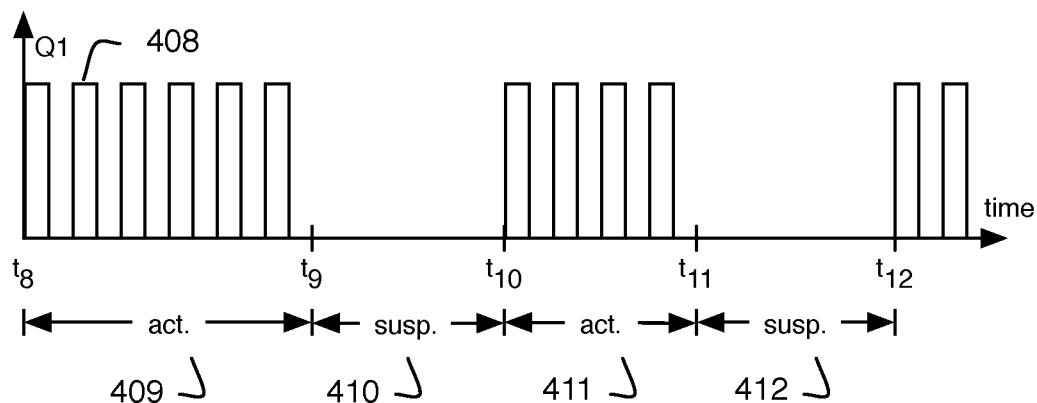

Alternatively, if more than a predetermined maximum number of pulses is required to bring the output voltage back to Vth_high, then T_wake may be reduced (i.e., subtractively or divisibly reduced by any suitable amount). In some embodiments, the maximum number of pulses that will trigger a reduction in T_wake may be given as "2n+m" pulses. This arrangement is illustrated in FIG. 4C. For example, assume that the minimum number of pulses remains at "n" and "m" is equal to one. Thus, if more than five (2*2+1) pulses are required, T_wake can be reduced, e.g., by halving. During active period 409, six pulses are required. Thus, T_wake is reduced (e.g., halved) such that the length of suspended switching period 410 (i.e., t10–t9) is half the length of previous suspended switching period 413 (i.e., t8–t7). During the next active switching period 411, four pulses are required, so T_wake can remain constant. In other words, suspended period 412 has the same length as suspended period 410 (i.e., t12–t11=t10–t9). Alternatively, if more than five pulses has been required, T_wake could be increased, or if fewer than two pulses had been required, T_wake could be reduced.

It may be desirable to select the minimum number of pulses and the maximum number of pulses such that for a given change (increment/decrement of T_wake), there are no oscillations or unstable operation for a steady state load. Thus, for example, if T_wake is to be doubled or halved in response to the minimum/maximum number of pulses, then the maximum number of pulses may preferably be more than twice the minimum number of pulses. If an alternative increment/decrement of T_wake is used, the minimum/maximum number of pulses may be changed suitably. In some embodiments, it may be preferable to have the minimum number of pulses be n, with the maximum number of pulses as 2n+m, with m at least 1, to provide a suitable hysteresis in the control system.

Figure 5:
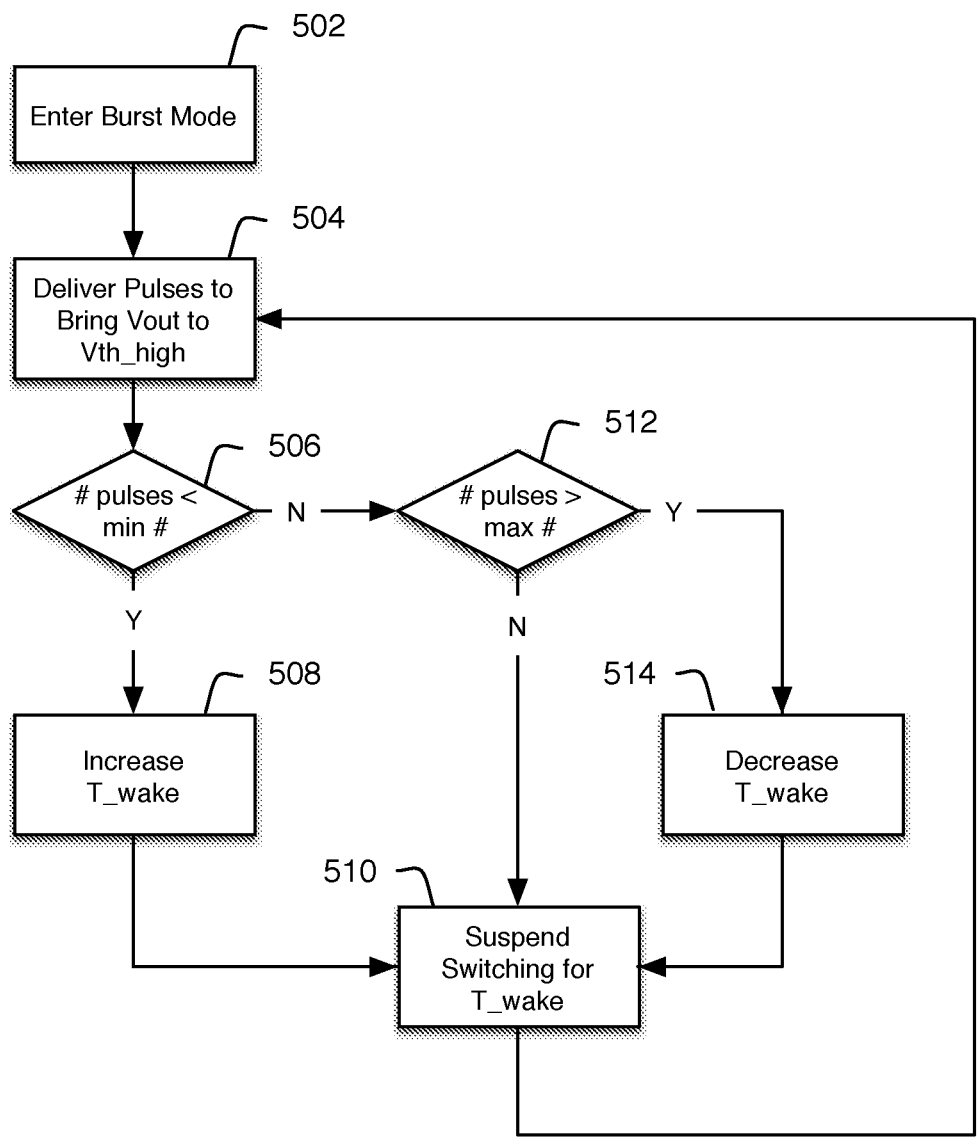
FIG. 5 depicts a flow chart of operations of a flyback converter having a burst mode with an adaptive wakeup time.

FIG. 5 depicts a flow chart illustrating the rules described above. Controller 304 may enter the burst mode (502). Then, controller 304 may operate power switch Q1 to deliver a number of pulses and bring output voltage Vout to upper threshold Vth_high (504). Controller 304 may then determine whether the number of pulses was greater than a predetermined minimum number of pulses. If not, (i.e., if fewer than the minimum number of pulses was delivered) controller 304 may increase T_wake (508) and may suspend switching of power switch Q1 for the increased time period T_wake (510). Thereafter, the process may be repeated (returning to block 504).

Alternatively, if controller 304 determined that the number of pulses delivered in block 504 was not less than the minimum number (506), controller 304 may also determine whether the number of pulses delivered was greater than a maximum number of pulses. If not, then switching may be suspended for T_wake (which is unchanged from a prior switching cycle), and the process may be repeated (returning to block 504). If so, controller 304 may decrease T_wake, suspend switching for the decreased time period T_wake (510), and repeat the process (504).

By following these rules, T_wake may be increased as the load decreases, while ensuring at least a minimum number of pulses is delivered, until T_wake reaches a maximum preset value or until the bias voltage approaches controller 304's under voltage lock out threshold. In this condition, initiation of an active switching period may be forced to ensure that controller 304 is able to remain in operation. Conversely, T_wake may be decreased as load increases until T_wake reaches a minimum preset value or until the load reaches a point where controller can return the flyback converter to normal voltage regulation mode. This operation is explained in further detail through an example below:

Consider a DCM (discontinuous conduction mode) flyback converter operating at a fixed switching frequency of 100 kHz. For such a converter, the total switching period will be 10 microseconds. If the converter is rated to deliver an output power of 10 W at an output voltage of 5.0V, it may be configured to enter burst mode operation at 1 W output load (i.e., 10% of rated output). Initial wakeup time, T_wake min may be set at 200 us. When the output power reduces marginally below 1 W, burst mode may be initiated, and switching may disabled for 200 us. Peak current may then increase slightly to compensate for the duty cycle created by the inactive time (i.e., switching suspended state) of the burst mode. By incorporating appropriate hysteresis in the burst threshold, the converter can continue to operate in burst mode to deliver an average output power of 1 W.

To ensure no more than 100 mV output ripple, the converter may need an output capacitor Cout of at least 404 uF to provide 1 W power to the load in 200 us inactive period. This value is reasonable for a 10 W power supply switching at 100 kHz. In some embodiments, the output capacitor may have a value much higher than 404 uF to handle AC ripple current at full load. Thus, burst mode operation need not require a capacitor value that is higher than the full load capacitance requirement.

If the output load remains at 1 W, there will be significant number of switching pulses during the active period of the burst mode. However, as the output power is gradually reduced, the number of pulses during active period will decrease. However, T_wake may initially remain at 200 us. A pulse counter (as part of controller 304) can count the number of pulses during the active time of the burst period. For purposes of this example, let n=5 and m=2; i.e., the minimum number of pulses required is 5 and the maximum number of pulses allowed is 12. Thus, pulse counting beyond 12 is not necessary. When the pulse count falls to 5, T_wake may be increased from 200 us to 400 us. To maintain the energy balance with the load remaining constant, the number of switching pulses may increase from 5 to 10. Thus, the maximum pulse count of 12 and minimum pulse count of 5 can provide required hysteresis for stable operation. If the load continues to decrease, the number of pulses may further decrease as well. When the pulse count again count reaches 5, T_wake may be increased again to 800 us, and so on.

It should be noted that during the off time, there may be some load on the internal bias rail of the converter. If the bias voltage falls due to discharge of its filter/storage capacitor and approaches a level when the bias undervoltage lockout would turn off the converter, then the active period may be forcibly reinitiated. Thus, the maximum wake up time T_wake max will depend upon various other converter parameters including, for example, quiescent current consumption of the controller and other internal loads. It will further be appreciated that very long T_wake times reduce standby power significantly.

If the output load is gradually increased, the pulse count will increase as well. When the pulse count reaches 12, T_wake may be reduced, e.g., halved. This change will reduce the number of pulses from 12 to 5 to maintain energy balance (at a constant load). If the load is increased further, again the pulse count will reach 12, and T_wake is reduced (e.g., halved) again. This process can continue until a minimum value of T_wake min (e.g., 200 us) is reached. After that, T_wake may be reduced no further. If the load is continues to increase, then at a certain load point, depending upon the hysteresis set in the design, (e.g., 1.5 W or 15% of rated power) the converter will exit the burst mode and start operating continuously.

The values used above are provided as non-limiting examples. All values may be altered as appropriate for a particular application. For example, the "n" and "m" values used to determine the minimum and maximum number of pulses may be selected as desired to select burst duty cycles and burst frequencies that can maintain energy balance for particular converter implementations. Additionally, it may be desirable to increase and/or decrease T_wake by different increments, etc.

Another advantage of the techniques described herein include reduction of output voltage undershoots and/or overshoots when a step load is applied that would cause the converter to remain in burst mode. For example, a converter may enter burst mode at 15% of the rated output load. While operating at 2% load, a step load may be applied that increases the load to 14% of the rated output load. Because the converter is operating in burst mode, the voltage regulation control loop of controller 304 is bypassed, and only the wakeup time will dictate the output voltage deviation. Such a condition would require a larger output capacitor Cout with a fixed T_wake, but may rely on a smaller capacitor when an adaptive wakeup technique as described herein is used.

USB-C PD Applications

Figure 6:
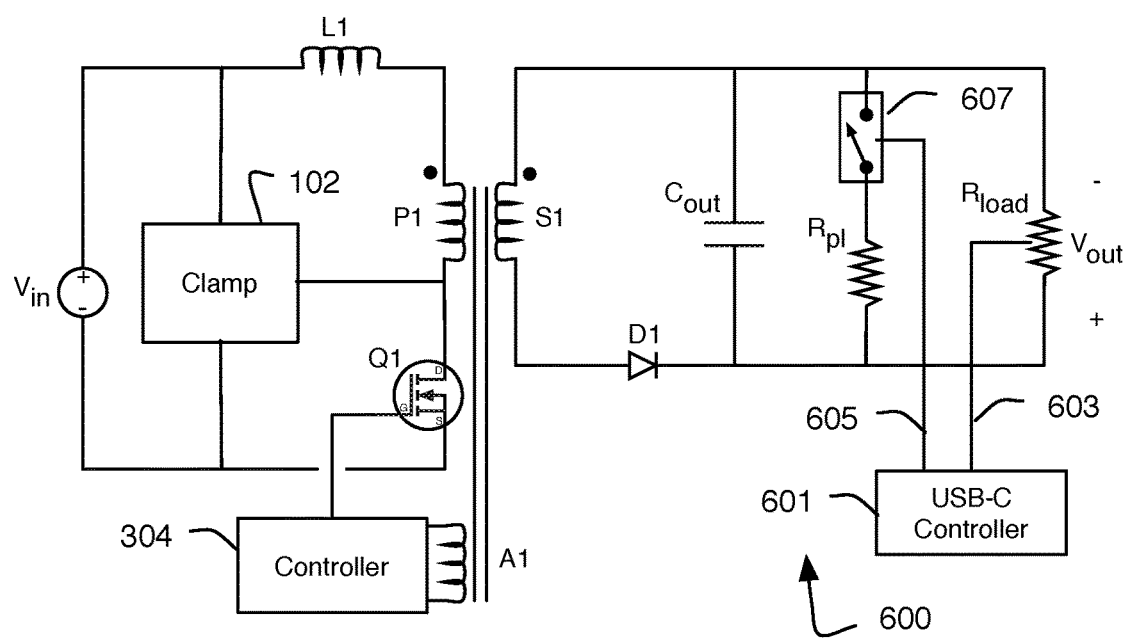
FIG. 6 depicts a schematic diagram of an AC/DC adapter comprising a flyback converter and a USB-C controller on the secondary side.

The embodiments described above may find particular applicability in conjunction with USB-C/USB-PD power adapters that are beginning to see wide-spread adoption in consumer electronics devices such as laptop and notebook computers, tablet computers, smartphones, and the like. USB-C compatible adapters follow a well-defined operational protocol. More specifically, a mechanism exists on the secondary side of the adapter that detects if the end system (e.g., a laptop computer) is connected or not. Such an arrangement is illustrated in FIG. 6, which schematically depicts an AC/DC adapter 600 incorporating a flyback converter as discussed above with respect to FIG. 3.

More specifically, AC/DC adapter 600 may also include a USB-C controller 601. Such controllers are available from a variety of vendors, or a custom controller may be implemented using various forms of circuitry, including, for example, a microprocessor, a microcontroller, a field programmable gate array (FPGA), application specific integrated circuit (ASIC), or the like. The surplus processing capacity of this microprocessor/microcontroller may be put to use to achieve the preload control functionality described below without incurring additional materials cost. USB-C controller 601 may be configured to detect the connection of an external device (represented by Rload) via signal line 603. Signal line 603 can thus carry a "device detected" signal, indicating that a device has been connected to the output of the AC/DC adapter 600. USB-C controller 601 can be further configured to, responsive to the detection of a connected device, adjust a preload on the output of the AC/DC adapter to force burst mode operation at a predetermined T_wake min (e.g., 200 us, as in the example above). As an example, USB-C controller 601 can use signal line 605 to close switch 607 connecting pre-load resistor Rpl in parallel with the output of the AC/DC adapter 600. Thus, connection of a device to AC/DC adapter 600 will put the adapter into a minimum inactive time mode, so that whenever a step load from the connected device is experienced, the output voltage dip will be very low, even with a small output capacitance value in the adapter. Conversely, when the device is disconnected, a corresponding device disconnect signal (or the absence of the device detected signal) can be used to signal AC/DC adapter 600 to remove output preload Rpl, e.g., by opening switch 607. This can allow adapter 600 to enter a deep burst mode, in which T_wake can be much longer, significantly reducing the standby power consumed by adapter 600.

Described above are various features and embodiments relating to flyback converters, and more particularly to flyback converters that are operated in a burst mode with primary side regulation and adaptive wakeup time control. Such converters may be used in a variety of applications, but may be particular advantageous when used in conjunction with portable electronic devices such as mobile telephones, smart phones, tablet computers, laptop computers, media players, and the like, as well as the peripherals associated therewith. Such associated peripherals can include input devices (such as keyboards, mice, touchpads, tablets, microphones and the like), output devices (such as headphones or speakers), combination input/output devices (such as combined headphones and microphones), storage devices, or any other peripheral. Other applications can include on-chip point of load regulators.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power converter comprising:
   a primary side having a primary winding operatively coupled to an input power source by a power switch;
   a secondary side having a secondary winding magnetically coupled to the primary winding and electrically coupled to an output configured for connection to a load;

an auxiliary winding magnetically coupled to the secondary winding and operatively coupled to a controller configured to operate the power switch responsive to a reflected output voltage sensed via the auxiliary winding to alternately close, thereby storing energy from the input power source in the primary winding, and open, thereby delivering energy from the secondary winding to the output, wherein the controller is further configured to:
  operate in a voltage regulation mode when a voltage error signal of the power converter exceeds a first threshold; and
  transition to an energy regulation mode when the voltage error signal of the power converter falls below the first threshold, wherein the energy regulation mode comprises a burst mode of operation in which the controller is configured to operate the power switch to deliver a number of pulses, thereby causing the reflected output voltage to reach an output voltage high threshold and suspend switching for a predetermined time period before delivering a further number of pulses, wherein the controller is further configured to count the number of pulses and:
    responsive to a determination that the count is less than a predetermined minimum number of pulses, increase the predetermined time period; or
    responsive to a determination that the count is greater than a predetermined maximum number of pulses, decrease the predetermined time period.

2. The power converter of claim 1, wherein the controller is further configured to transition back to a voltage regulation mode when a voltage error signal of the power converter exceeds a second threshold.

3. The power converter of claim 2, wherein the second threshold is greater than the first threshold.

4. The power converter of claim 1, wherein the controller is configured to increase the predetermined time period by doubling the predetermined time period and decrease the predetermined time period by halving the predetermined time period.

5. The power converter of claim 4, wherein the minimum number of pulses is n, and the maximum number of pulses is 2n+m, where m is at least 1.

6. The power converter of claim 5, wherein the minimum number of pulses is five, and the maximum number of pulses is twelve.

7. The power converter of claim 1, further comprising a USB-C controller configured to detect connection of an external device as a load to the output of the power converter and, responsive thereto, adjust a preload on the output of the power converter.

8. A controller for a flyback converter, the controller comprising:
  an input configured to receive a reflected output voltage of the flyback converter via an auxiliary winding of the flyback converter, the auxiliary winding being magnetically coupled to a secondary winding of the flyback converter and the secondary winding being electrically coupled to an output of the flyback converter; and
  an output configured to be coupled to a power switch of the flyback converter, the power switch being operable to alternately couple and decouple a primary winding of the flyback converter to an input power source, thereby delivering pulses of energy from an input of the flyback converter to an output of the flyback converter; and
  circuitry configured to:
    operate the power switch to deliver a number of pulses, thereby causing the reflected output voltage to reach an output voltage high threshold;
    suspend switching for a predetermined time period before delivering a further number of pulses;
    count the number of pulses; and
    responsive to a determination that the count is less than a predetermined minimum number of pulses, increase the predetermined time period by doubling the predetermined time period; or
    responsive to a determination that the count is greater than a predetermined maximum number of pulses, decrease the predetermined time period by halving the predetermined time period.

9. The controller of claim 8, wherein the minimum number of pulses is n, and the maximum number of pulses is 2n+m, where m is at least 1.

10. The controller of claim 9, wherein the minimum number of pulses is five and the maximum number of pulses is twelve.

11. The controller of claim 8, wherein the controller is a microprocessor or microcontroller.

12. A method of operating a flyback converter, the flyback converter having a primary side including a primary winding operatively coupled to an input power source by a power switch, a secondary side including a secondary winding magnetically coupled to the primary winding and electrically coupled to an output, and an auxiliary winding magnetically coupled to the secondary winding, the method comprising:
  sensing a reflected output voltage of the flyback converter via the auxiliary winding;
  responsive to the reflected output voltage, operating the power switch to deliver a number of pulses, thereby causing the reflected output voltage to reach an output voltage high threshold; and
  suspending switching for a predetermined time period before delivering a further number of pulses;
  count the number of pulses; and
  responsive to a determination that the count is less than a predetermined minimum number of pulses, increasing the predetermined time period by doubling the predetermined time period; or
  responsive to a determination that the count is greater than a predetermined maximum number of pulses, decreasing the predetermined time period by halving the predetermined time period.

13. The method of claim 12, wherein the minimum number of pulses is n, and the maximum number of pulses is 2n+m, where m is at least 1.

14. The method of claim 13, wherein the minimum number of pulses is five and the maximum number of pulses is twelve.

\* \* \* \* \*